US012794349B2

(12) United States Patent
Weis

(10) Patent No.: US 12,794,349 B2
(45) Date of Patent: Nov. 10, 2026

(54) METHOD FOR PREVENTING FLICKER EMISSIONS OF CONVERTERS

(71) Applicant: Siemens Aktiengesellschaft, Munich (DE)

(72) Inventor: Benno Weis, Hemhofen (DE)

(73) Assignee: Siemens Aktiengesellschaft, Munich (DE)

(*) Notice: Subject to any disclaimer, the term of this patent is extended or adjusted under 35 U.S.C. 154(b) by 233 days.

(21) Appl. No.: 18/688,173

(22) PCT Filed: Aug. 5, 2022

(86) PCT No.: PCT/EP2022/072043
§ 371 (c)(1),
(2) Date: Feb. 29, 2024

(87) PCT Pub. No.: WO2023/030822
PCT Pub. Date: Mar. 9, 2023

(65) Prior Publication Data

US 2024/0388194 A1 Nov. 21, 2024

(30) Foreign Application Priority Data

Sep. 1, 2021 (EP) .................................... 21194379

(51) Int. Cl.
*H02M 1/00* (2007.01)
*H02M 1/12* (2006.01)
(Continued)

(52) U.S. Cl.
CPC ............. *H02M 1/12* (2013.01); *H02M 1/007* (2021.05); *H02M 1/15* (2013.01); *H02M 1/32* (2013.01)

(58) Field of Classification Search
CPC .......... H02M 1/12; H02M 1/007; H02M 1/15; H02M 1/32; H02M 1/0025; H02M 7/217; H02M 1/00
(Continued)

(56) References Cited

U.S. PATENT DOCUMENTS

2002/0093836 A1* 7/2002 Goepfrich ............... H02P 29/50 363/16
2022/0352809 A1 11/2022 Köllensperger et al.

FOREIGN PATENT DOCUMENTS

DE 102007016330 * 10/2008
EP 3 799 282 A1 3/2021

OTHER PUBLICATIONS

Wiereda, Rene: "Flicker ou scintillement des sources lumineuses"; Dec. 15, 1995 (Dec. 15, 1995), pp. 1-24, XP055891598.
(Continued)

*Primary Examiner* — Rexford N Barnie
*Assistant Examiner* — Xuan Ly
(74) *Attorney, Agent, or Firm* — Henry M Feiereisen, LLC

(57) ABSTRACT

A converter includes a load converter for supplying an electric load, an active grid converter connected at a connection point to an electric power supply grid, and an intermediate circuit supplied by the active grid converter with an intermediate circuit voltage. Flicker emissions of the active grid converter on the power supply grid can be prevented by controlling the active grid converter so that a grid current change at the connection point maintains a maximum permissible change of effective values of successive voltage half-cycles of a voltage at the connection point by taking into account a grid impedance determined from a power grid analysis of the active grid converter at the connection point.

11 Claims, 1 Drawing Sheet

(51) Int. Cl.
*H02M 1/15* (2006.01)
*H02M 1/32* (2007.01)

(58) Field of Classification Search
USPC ........................................................... 307/31
See application file for complete search history.

(56) References Cited

OTHER PUBLICATIONS

"Assessm.ent of power quality—Characteristics of electricity supplied by public networks"; IEC TS 62749:2020 RLV, IEC, 3, Rue De Varembe, Po Box 131, CH-1211 Geneva 20, Switzerland; Feb. 11, 2020 (Feb. 11, 2020), pp. 1-119, XP082020147.

Yang X: "Flicker emission assessments and a new method based on RMS measurements"; Power&Energy Society General Meeting, 2009. PES '09. IEEE, IEEE, Piscataway, NJ, USA; Jul. 26, 2009 (Jul. 26, 2009), pp. 1-7, XP031538875.

Meegahapola L. et al: "Voltage and power quality improvement strategy for a DFIG wind farm during variable wind conditions"; Modern Electric Power Systems : MEPS '10, Sep. 20-22, 2010, Wroclaw, Poland, IEEE, Piscataway, NJ, USA; Sep. 20, 2010 (Sep. 20, 2010), pp. 1-6, XP031834099.

PCT International Search Report and Written Opinion of International Searching Authority mailed Oct. 1, 2023 corresponding to PCT International Application No. PCT/EP2022/072043 filed May 8, 2022.

* cited by examiner

METHOD FOR PREVENTING FLICKER EMISSIONS OF CONVERTERS

CROSS-REFERENCES TO RELATED APPLICATIONS

This application is the U.S. National Stage of International Application No. PCT/EP2022/072043, filed Aug. 5, 2022, which designated the United States and has been published as International Publication No. WO 2023/030822 A1 and which claims the priority of European Patent Application, Serial No. 21194379.0, filed Sep. 1, 2021, pursuant to 35 U.S.C. 119 (a)-(d).

BACKGROUND OF THE INVENTION

The invention relates to a method for preventing flicker emissions in electric power grids for active and passive grid power converters, as well as loads that can be connected to such a power grid.

Converters are devices that use electronic means to convert an alternating or three-phase voltage into a new alternating or three-phase voltage system.

A converter or frequency converter comprises a grid converter that rectifies the grid voltage for a DC link ("intermediate circuit") and a load converter that converts the voltage of the DC link to AC for a consumer, i.e. a load.

Active grid converters, such as AFEs (Active Front Ends) for drive applications, adjust their DC link voltage $U_{ZK}$ to a constant value. Changes in the power consumption of a connected load, e.g. a motor, are therefore directly reflected in the grid current $I_N$ drawn by the converter. The grid current $I_N$ causes a voltage change in the voltage $U_A$ at the connection point A of the converter due to its voltage drop in the internal impedance $Z_N$ of the grid. This means that load changes are directly visible in the voltage $U_A$.

Limit values for permissible changes in the rms value of successive half-cycles of the voltage $U_A$ at connection point A must be maintained. The permissible amount of voltage variation depends on its frequency. A minimum permissible voltage variation is approx. 1000 changes per minute, i.e. 16.6 Hz. If these limit values are exceeded, the "flicker" phenomenon occurs.

This manifests itself in fluctuations in the brightness of lighting equipment that are harmful to health.

Flicker therefore refers to electrical voltage fluctuations in power grids, resulting in a visually perceptible fluctuation in the luminance of uncontrolled electrical light sources such as fluorescent lamps or incandescent lamps. In the case of sufficiently electronically controlled light sources, such as LED lights or compact fluorescent lamps, flicker is often not visually perceptible because of the ballast electronics.

Flicker phenomena are one of many criteria for assessing the voltage quality in power grids and evaluating grid perturbations from loads in such grids. Flicker refers to fluctuations in luminance that originate in the supply grid, while light flicker describes fluctuations in brightness that are caused by the design of the light source.

The operating voltage in power grids is subject to temporal fluctuations. Regular load fluctuations of larger loads result in fluctuating currents in the grid. Depending on the grid impedance, these current fluctuations cause a fluctuating voltage drop in the lines. Additional sources of voltage fluctuations are intermodulations in the harmonic range of the grid frequency which are caused by the distortive reactive power of non-linear loads.

If the connected load of a frequency converter exhibits periodic load changes resulting in voltage changes exceeding the flicker limit value in the voltage $U_A$, this installation must not be connected to the public power grid, e.g. a low-voltage grid.

Although no standardized flicker limit values apply in industrial installations, fluctuations in the brightness of lighting equipment also affect the health of workers in industrial installations.

In the current state of the art, installations subject to such load changes may only be connected to power grids in which the grid impedance $Z_N$ is low enough to ensure that load changes do not result in impermissible voltage changes. Designing devices for this purpose is very complex and uncertain.

The object of the invention is therefore to provide a method for preventing flicker emissions of a converter connected to a power grid. In addition, devices equipped with such a converter are to be designed to prevent such flicker emissions.

SUMMARY OF THE INVENTION

This object is achieved by a method for preventing flicker emissions of an active grid converter connected to a power grid, wherein a converter comprises a load converter for supplying an electrical load, an active grid converter at a connection point A of the electrical power grid, for supplying a DC link with a DC link voltage $U_{ZK}$ of the converter, wherein the DC link comprises at least one capacitor, by means of the following steps:

- determining the grid impedance $Z_N$ of the power grid from a power grid analysis of the active grid converter at the connection point A,
- adjusting the active grid converter to a predefinable permissible grid current change $\Delta I_N$ at which permissible changes in the rms value of successive voltage half-cycles of the voltage $U_A$ at the connection point A are maintained with respect to the grid impedance $Z_N$.

The basic concept of this invention is that the control system of the active grid converter no longer adjusts solely to a constant DC link voltage, but deliberately allows changes in the DC link voltage in order to prevent changes in the power consumption of the load, e.g. a motor, from becoming visible in the grid current $I_N$. The at least one DC link capacitor is used as an energy store to compensate for preferably small load changes.

According to the invention, the load converter therefore does not adjust its load—only the active grid converter does so. The difference in power between the two converters (active grid converter, load converter) results in a change in the voltage of the DC link capacitor, which is thus used as an energy buffer. This means that the load does not "see" any change in power and no additional energy storage is required in the DC link because the DC link capacitor is present anyway and inventively performs this energy storage function.

The grid impedance $Z_N$ is known from a power grid analysis of the active grid converter.

According to the invention, the control system of the active grid converter now continuously calculates the maximum permissible grid current change $\Delta I_N$ at which the flicker limit values are still just maintained. The change in $I_N$ is limited to this maximum permissible change.

The flicker limit values apply to the individual phase voltages at the connection point $U_A$ with respect to the grid star point, because lighting equipment is generally connected in single phase.

In an advantageous embodiment of the invention, the permissible current changes are therefore calculated separately for all three phases.

The limiting of the current change $I_N$ results in changes in the DC link voltage $U_{ZK}$ of the converter. With increasing load changes, this can result in the DC link voltage reaching the switch-off threshold for overvoltage or undervoltage.

In this case, either load shutdown or breaching of the flicker limit values can be accepted.

In order to prevent this state for the subsequent operating time, the control system of the converter in this case inventively generates a warning message that e.g. an additional DC link capacitor should be connected or switched in, in order to avoid this conflict of objectives in future. The extent to which the permissible current change $\Delta I_N$ is exceeded can also be used to calculate how much additional DC link capacitance is required to compensate for such load fluctuations in the future.

In an advantageous solution according to the invention, this warning is not only issued when the switch-off threshold is reached, but even beforehand, e.g. at a 10% distance from the switch-off threshold.

In a further advantageous embodiment, the algorithm for calculating the changes in the grid current $I_N$ in advance is implemented in design software for drives. This makes it possible to design the required DC link capacitance for a specific customer installation with expected load cycles and an expected grid impedance, with which flicker limit values can be maintained without shutdowns due to overvoltage or undervoltage.

The object can also be achieved by a method for preventing flicker emissions of a passive grid converter on a power grid, wherein a converter comprises a load converter for supplying an electrical load, a passive grid converter at a connection point A of the electrical power grid, for supplying a DC link with a DC link voltage $U_{ZN}$ of the converter, wherein the DC link has at least one capacitor, by means of the following steps:

- storing local maxima of the DC link voltage $U_{ZN}$ and determining therefrom the voltage fluctuation at the connection point A of the converter on the power grid,
- adjusting the grid current $I_N$ in order to keep the DC link voltage $U_{ZN}$ within a range compliant with the flicker emissions by complying with the permissible changes in the rms value of successive voltage half-cycles of the voltage $U_A$ at the connection point A.

The method according to the invention will thus also be used for passive grid converters with diode infeed. Since a passive diode rectifier does not generally recognize the grid impedance, it stores the local maxima of the DC link voltage. These correspond to the maxima of the grid voltage at connection point A. The voltage fluctuation at connection point A can be determined from the difference between these maxima.

The observation time for the changes in the voltage $U_A$ is inventively limited, e.g. to a period of one second. This prevents changes in the ideal grid voltage $U_N$ from being misinterpreted by other external loads as flicker emissions.

In order to further reduce such misinterpretations, the invention establishes a temporal correlation between changes in the DC link voltage and changes in the power at the load output. The voltage change is only interpreted as flicker if the changes in the DC link voltage also correlate timewise with power changes at this device output. This ensures that unbalances in the grid voltage are not interpreted as flicker.

Also in the case of the passive grid converter, limiting the current change $I_N$ results in changes in the DC link voltage $U_{ZK}$ of the converter. With increasing load changes, this can result in the DC link voltage reaching the switch-off threshold for overvoltage or undervoltage.

In this case, either load shutdown or breaching of the flicker limit values are acceptable.

In order to avoid this state of affairs for the subsequent operating time, the control system of the converter inventively generates a warning message in this case, e.g. to notify that an additional DC link capacitor should be connected or switched in, in order to avoid this conflict of objectives in the future. The extent to which the permissible current change $\Delta_{IN}$ is exceeded can also be used to calculate how much additional DC link capacitance is required to compensate for such load fluctuations in the future.

In an advantageous solution according to the invention, this warning is not only issued when the switch-off threshold is reached, but even beforehand, e.g. at a 10% distance from the switch-off threshold.

In a further advantageous embodiment, the algorithm for calculating the changes in the grid current $I_N$ in advance is implemented in design software for drives. This makes it possible to design the required DC link capacitance for a specific customer installation with expected load cycles and an expected grid impedance, said capacitance enabling flicker limit values to be maintained without shutdowns due to overvoltage or undervoltage.

The object can also be achieved by using the methods according to the invention to control an active grid converter or to control a passive grid converter for single-phase loads, in particular household appliances, and three-phase loads, in particular electric drives.

The inventive solutions allow devices to be used in applications that are not currently possible. Customer complaints about flicker emissions can thus be averted.

In addition, the designing of electric drives is simplified for customers.

The object is also achieved by a converter comprising a load converter for supplying an electrical load, an active grid converter at a connection point A of an electrical power grid, for supplying a DC link of the converter, wherein the DC link has at least one capacitor, wherein the converter implements the method according to the invention in the case of an active grid converter in order to prevent impermissible flicker emissions.

The object is also achieved by a converter having a load converter for supplying an electrical load, a passive grid converter at a connection point A of an electrical power grid, for supplying a DC link of the converter, wherein the DC link has at least one capacitor, wherein the converter implements the method according to the invention in the case of a passive grid converter in order to prevent impermissible flicker emissions.

The object can also be achieved by electrical loads, such as electric drives, household appliances having a single-phase or three-phase converter according to the invention.

BRIEF DESCRIPTION OF THE DRAWING

The invention and further advantageous embodiments of the invention will now be explained in more detail with reference to examples shown in the drawings in which.

DETAILED DESCRIPTION OF PREFERRED EMBODIMENTS

Figure 1:
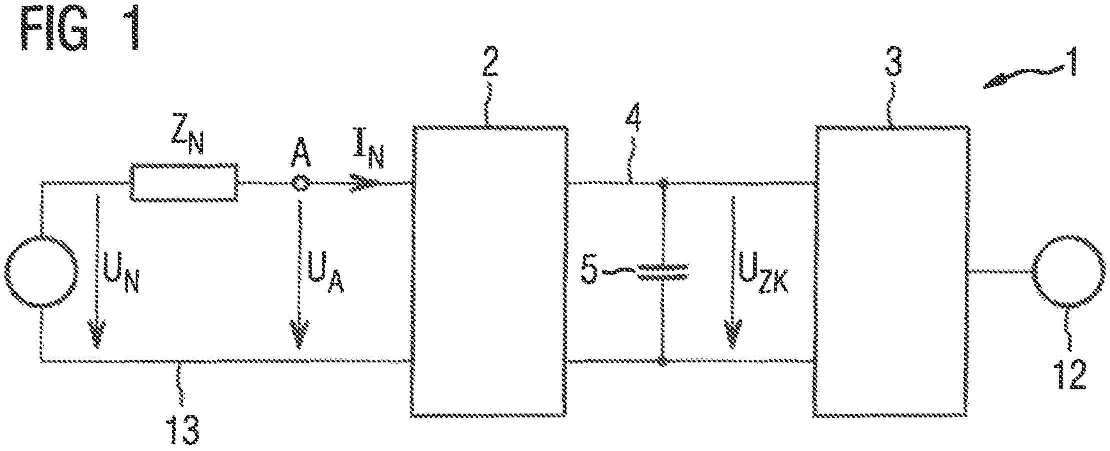
FIG. 1 schematically illustrates a load on a converter with active grid converter.

FIG. 1 schematically illustrates a converter 1 with a load, e.g. a motor 12, and having an active grid converter 2 which rectifies a grid voltage $U_N$ for a DC link 4 and a load converter 3 which converts the voltage of the DC link $U_{ZK}$ to AC for the motor 12. The converter 1 is electrically connected to a power grid 13 at a connection point A and draws a grid current $I_N$.

Changes in the power consumption of the motor 12 are therefore directly reflected in the grid current $I_N$ drawn by the converter 1. The grid current $I_N$ causes a voltage change in the voltage $U_A$ at the connection point A of the converter 1 due to its voltage drop in the internal impedance $Z_N$ of the power grid 13. This means that load changes are directly visible in the voltage $U_A$.

The power grid 13 has a grid voltage $U_N$ that requires a predefinable quality of grid voltage $U_N$, e.g. limit values for flicker phenomena.

According to the invention, the control system of the active grid converter 2 now no longer adjusts to a constant DC link voltage $U_{ZK}$, but allows changes in the DC link voltage $U_{ZK}$ in order to prevent changes in the power consumption of the load, e.g. the motor 12, from becoming "visible" in the grid current $I_N$ in such a way that flicker occurs. The DC link capacitor 5 is initially used as an energy store to compensate for load changes. However, this is not possible for every load change, so that the control system of the active grid converter 2 continuously determines the maximum permissible grid current change $\Delta I_N$ at which the flicker limit values are just maintained.

The change in the grid current $I_N$ drawn is now limited to this maximum permissible change by the method according to the invention.

The grid impedance $Z_N$ required for this purpose is known from a power grid analysis of the active grid converter 2 and constitutes an input parameter for the control system on the grid converter 2.

The flicker limit values to be maintained apply to the individual phase voltages at the connection point $U_A$ with respect to the grid star point, because lighting equipment is generally connected in single phase.

In an advantageous embodiment of the invention, the permissible current changes $\Delta I_N$ are therefore calculated separately for all three phases of the power grid 13.

The method according to the invention is also suitable for special industrial grids that are not designed as single-phase or three-phase systems.

Figure 2:
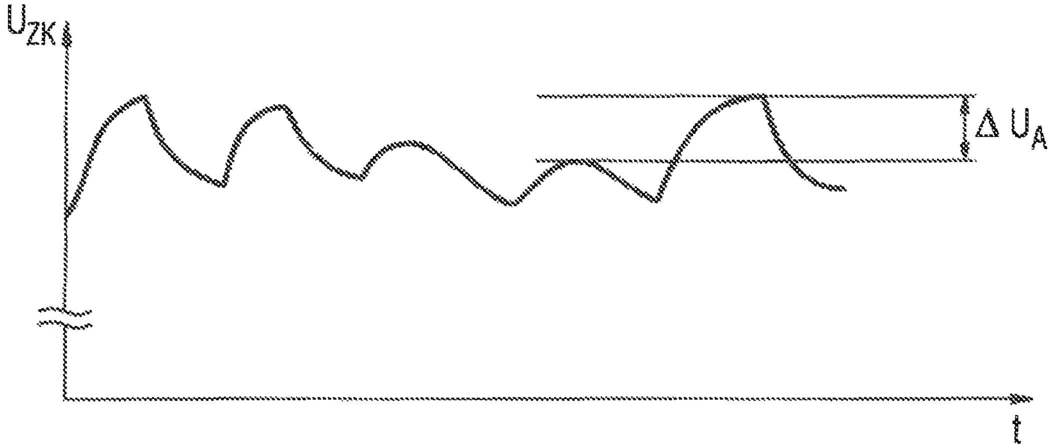
FIG. 2 shows determinations of voltage fluctuations on a converter having a passive grid converter.

The method according to the invention for controlling an active grid converter is carried out as follows, as shown in FIG. 2:

In a first step, the grid impedance of the power grid 13 is first determined by means of the active grid converter 2 of the converter 1. Then, in a subsequent step, the maximum permissible grid current changes $\Delta I_N$ at which the specified flicker limit values are still maintained are continuously calculated for the load currently applied to the converter 1.

In a further step, the thereby changed DC link voltage $U_{ZK}$ is checked to ascertain whether either the connected load, e.g. the motor 12, has been switched off or the specified flicker limit values have been breached or are accepted.

With increasing load changes, this can result in the DC link voltage reaching a switch-off threshold for overvoltage or undervoltage.

In order to avoid this state of affairs, in a further step a warning message is therefore sent in advance to the device and/or a higher-level control room, e.g. to provide/connect-in an additional DC link capacitor in order to avoid this conflict of objectives in the event of future load changes. The level of changes can be used to calculate the required size of the DC link capacitance.

Ideally, this warning message is sent before the switch-off threshold is reached, e.g. 10% before the switch-off threshold.

In order to avoid this state of affairs for the subsequent operating time of the load, the control system of the converter 1 in this case inventively generates the above-mentioned warnings that an additional DC link capacitor should be connected in order to avoid this conflict of objectives in future.

The extent to which the permissible current change $\Delta I_N$ is exceeded can also be used to calculate how much additional DC link capacitance needs to be provided in order to compensate for the (known) load fluctuations of this load on the converter 1 in the future.

In the case of a passive grid converter with diode feed into the DC link 4, flicker emissions are prevented as follows. (The schematic diagram of converter 1 applies accordingly). Since a passive diode rectifier is generally unaware of the grid impedance, it stores the local maxima of the DC link voltage as shown in FIG. 2. These correspond to the maxima of the grid voltage $U_N$ at connection point A. The voltage fluctuation at connection point A can be determined from the difference between these maxima.

According to the invention, the observation time for the changes in the voltage $U_A$ is limited e.g. to a period of one second. This prevents changes in the ideal grid voltage $U_N$ from being misinterpreted as flicker emissions.

In order to further reduce corresponding misinterpretations of the operation of the converter 1, a time correlation between changes in the DC link voltage and changes in the power at the load output is inventively established. This voltage variation is interpreted as flicker only if the changes in the DC link voltage also correlate timewise with power changes at the converter output. This ensures that unbalances in the grid voltage caused by other loads are not interpreted as flicker.

Intervention in the control of the current $I_N$ takes place only if there is a time correlation, i.e. the voltage change is due to load changes.

In principle—this applies to both the active and the passive grid converter—the grid voltage of the power grid 13 is rectified for the intermediate circuit 4, more precisely the DC link, and made available to the load converter 3, which converts the voltage of the DC link 4 into AC for a consumer, i.e. a load 12.

Individual features of the respective embodiments of the active or passive power converters can also be combined where appropriate without departing from the essential scope of the invention.

The invention claimed is:

1. A method for preventing flicker emissions in a converter, the converter comprising a DC-AC load converter for supplying an electrical load and an AC-DC active grid converter connected to a power grid at a connection point and supplying a DC link having at least one capacitor with a DC link voltage and operating as an energy store, the method comprising:

determining the grid impedance of the power grid from a power grid analysis of the active grid converter at the connection point, and controlling a grid voltage of the active grid converter at the connection point so as to maintain the grid voltage within a maximum permissible change of effective values of successive voltage half-cycles by drawing a current from the energy store determined by taking into account the grid impedance, thereby preventing flicker-induced power changes at the electric load from introducing flicker emissions in the power grid.

2. The method of claim 1, further comprising triggering a warning message when the DC link voltage reaches a switch-off threshold caused by an increase in the electrical load.

3. The method of claim 1, wherein the warning message is triggered when the DC link voltage is less than or greater than a switch-off threshold by a predetermined offset voltage.

4. The method of claim 3, wherein the predetermined offset voltage is 10% of the switch-off threshold.

5. The method of claim 1, wherein the electrical load is a single-phase electrical load and the power grid is a public power grid or an industrial power grid.

6. The method of claim 1, wherein the electrical load is a three-phase electrical load and the power grid is a public power grid or an industrial power grid, and wherein the grid converter is controlled for each of the three phases.

7. The method of claim 5, wherein the single-phase electrical load comprises a household appliance.

8. The method of claim 6, wherein the three-phase electrical load comprises an electric drive.

9. A converter, comprising:

a DC-AC load converter for supplying an electrical load;

an AC-DC active grid converter having a connection point connected to an electrical power grid; and a DC link connecting the DC-AC load converter and the AC-DC active grid converter and comprising at least one capacitor operating as an energy store, wherein the AC-DC active grid converter is controlled so that a grid voltage at the connection point is maintained within a maximum permissible change of effective values of successive voltage half-cycles by drawing a current from the energy store determined by taking into account a grid impedance determined from a power grid analysis of the active grid converter at the connection point, thereby preventing flicker-induced power changes at the electric load from introducing flicker emissions in the power grid.

10. An electrical load, comprising a converter, said converter comprising a DC-AC load converter for supplying an electrical load, an AC-DC active grid converter having a connection point connected to an electrical power grid, and a DC link connecting the DC-AC load converter and the AC-DC active grid converter and comprising at least one capacitor operating as an energy store, wherein the AC-DC active grid converter is controlled so that a grid voltage at the connection point is maintained within a maximum permissible change of effective values of successive voltage half-cycles by drawing a current from the energy store determined by taking into account a grid impedance determined from a power grid analysis of the active grid converter at the connection point, thereby preventing flicker-induced power changes at the electric load from introducing flicker emissions in the power grid.

11. The electrical load of claim 10, embodied as an electric drive or a household appliance.

* * * * *